US008506007B2

(12) United States Patent
Nellen et al.

(10) Patent No.: US 8,506,007 B2
(45) Date of Patent: Aug. 13, 2013

(54) ROOF ASSEMBLY FOR A ROOF OF A VEHICLE, AND METHOD OF MOVING A CLOSURE PANEL AND WIND DEFLECTOR OF A ROOF ASSEMBLY

(75) Inventors: Marcel Johan Christiaan Nellen, Merselo (NL); Eduardus Christianus Henricus Van Boxtel, Zeeland (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 13/383,672

(22) PCT Filed: Jul. 13, 2010

(86) PCT No.: PCT/EP2010/060061
§ 371 (c)(1),
(2), (4) Date: Jan. 12, 2012

(87) PCT Pub. No.: WO2011/006892
PCT Pub. Date: Jan. 20, 2011

(65) Prior Publication Data
US 2012/0112497 A1    May 10, 2012

(30) Foreign Application Priority Data
Jul. 15, 2009   (EP) ..................................... 09165526

(51) Int. Cl.
*B60J 7/22*  (2006.01)
*B60J 7/047*  (2006.01)
(52) U.S. Cl.
USPC ................. 296/217; 296/216.03; 296/216.05; 296/216.08
(58) Field of Classification Search
USPC ................... 296/217, 216.03, 216.05, 216.08
See application file for complete search history.

(56) References Cited

U.S. PATENT DOCUMENTS
| | | | |
|---|---|---|---|
| 4,081,194 A * | 3/1978 | Jardin | 296/217 |
| 6,666,503 B1 * | 12/2003 | Sorensen | 296/217 |
| 6,942,286 B2 * | 9/2005 | Bohm et al. | 296/216.05 |

FOREIGN PATENT DOCUMENTS
| | | |
|---|---|---|
| DE | 19827106 | 1/1999 |
| DE | 10349002 | 3/2005 |
| DE | 102005040994 | 3/2007 |
| DE | 102008018435 | 6/2009 |
| JP | 06087332 | 3/1994 |

OTHER PUBLICATIONS

European Search Report and the Written Opinion of the European Patent Office Patent Office in counterpart foreign application No. PCT/EP2010/060061 filed Jul. 13, 2010.

* cited by examiner

*Primary Examiner* — Dennis Pedder
(74) *Attorney, Agent, or Firm* — Steven M. Koehler; Westerman, Champlin & Kelly, P.A.

(57) ABSTRACT

A roof assembly for a vehicle having a roof opening in its fixed roof, comprises a frame, a movable closure for opening and closing the roof opening, and guide rails in or on the frame extending laterally of the roof opening. A closure moving mechanism is guided in the guide rails. A wind deflector is positioned at a front edge of said roof opening and is movable between an inoperative lower position in which it is positioned substantially below the level of the vehicle roof and at least one operative upper position in which it at least partially extends above said level. The wind deflector is supported by arms, each extending substantially rearwards. The arms are adapted to move the wind deflector between the inoperative and operative positions. The wind deflector arms are positioned in plan view at least partly within the lateral boundaries of the respective guide rails.

15 Claims, 8 Drawing Sheets

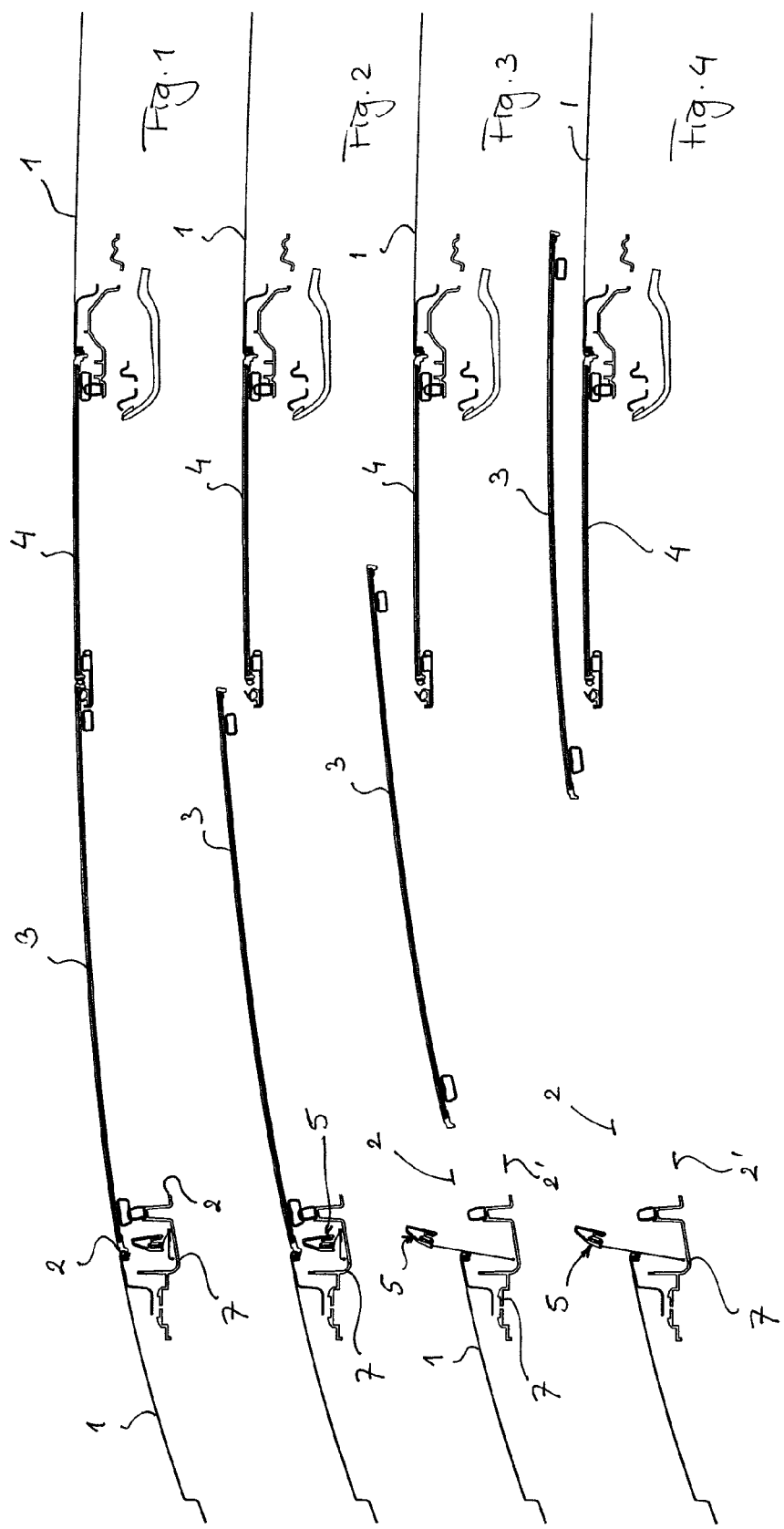

ROOF ASSEMBLY FOR A ROOF OF A VEHICLE, AND METHOD OF MOVING A CLOSURE PANEL AND WIND DEFLECTOR OF A ROOF ASSEMBLY

CROSS-REFERENCE TO RELATED APPLICATION

This application is a Section 371 National Stage Application of International Application PCT/EP2010/060061 filed Jul. 13, 2010 and published as WO/2011/006892 in English.

BACKGROUND

The discussion below is merely provided for general background information and is not intended to be used as an aid in determining the scope of the claimed subject matter.

Aspects of the present invention relate to a roof assembly for a roof of a vehicle and a method of moving and closing a closure and wind deflector.

In a known roof assembly, the wind deflector is provided with arms at its lateral ends, which are positioned inwardly of the guide rails. This positioning reduces the lateral dimension of the passage opening in the stationary part of the roof assembly and also leaves a considerable lateral gap between the wind deflector and the roof opening causing undesirable aerodynamic noise.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of a roof assembly herein described includes arms for supporting a wind deflector that are positioned one plane view from above that are at least partly within the lateral boundaries of respective guide rails.

Due to the placement of the wind deflector arms within the boundaries of the guide rails, the wind deflector can be positioned laterally closer to the roof opening, thereby diminishing the aerodynamic noises in this region. The lateral passage opening between the guide rails may also be increased as no room for support is necessary anymore for the wind deflector inwardly of the guide rails.

The lateral dimension of the guide rails does not have to be increased, especially not if there is a lateral overlap between the wind deflector arms and one or more parts of the closure moving mechanism. This can be accomplished by allowing parts of the closure moving mechanism to extend or move above and/or below the wind deflector arms.

in one embodiment, the wind deflector arms are adapted to pivot around a pivoting axis, the pivoting axis of each wind deflector arm being positioned in a part of the guide rail that serves to catch and drain any water from the roof or closure. Generally, many parts of the closure moving mechanism are supported in this so called "wet part" of the guide rail as well.

In a particular embodiment, the closure comprises a closure panel and the closure moving mechanism comprises a panel support fixed to the panel above the respective guide rails, each of said panel supports can be provided with a front slide shoe guided in the respective guide rails. In one embodiment, the front slide shoe is guided in a guide groove of the respective guide rail which extends at least partly under a support structure of the wind deflector arm, said guide groove may be open towards a lateral outer side of the roof assembly. Thus, this is one way of allowing a part of the closure moving mechanism to overlap with the wind deflector.

This embodiment is particularly useful if the closure moving mechanism for the closure panel is adapted to move the panel rearwardly above the panel roof, wherein a front portion of the groove for the front slide shoe extends at a lower level than a rear portion thereof.

In this type of roof assemblies, for example top slider roofs or spoiler roofs, the path of the front slide shoe groove in the guide rails leads to the advantage that the wind deflector can be moved to its open position before the front side of the panel is moved to a higher position, which reduces undesirable aerodynamic noises.

In a further development of the roof assembly, each panel support extends at least partly above the wind deflector arm, at least in the closed position of the closure. This panel support is a further part overlapping the wind deflector arm. This has the additional advantage that each panel support may be provided with a sliding element adapted to engage the upper side of the respective wind deflector arm, in order to move it when the closure panel is close to its closed position. Thus, the overlapping relationship between a part of the closure moving mechanism and the wind deflector arm can be used to enable the panel support to function as a wind deflector control element, which used to be the panel itself in the prior art.

An aspect of the invention also includes a method of moving a closure panel and wind deflector of a roof assembly for a vehicle roof, said closure panel being movable between a closed position closing a roof opening in the vehicle roof and an open position in which the closure panel is moved rearwardly above the level of the vehicle roof, said wind deflector being positioned in front of the roof opening and being movable between an inoperative lower position in which it is positioned substantially below the level of the vehicle roof and at least one operative upper position in which it extends at least partially above said level, the method including the subsequent steps of: moving the closure panel from the closed position in the roof opening to a venting position in which a rear side of the closure panel is moved upwardly, and a front side of the closure panel is kept substantially at a constant level with respect to the vehicle roof, moving the closure panel rearwardly while simultaneously moving the wind deflector from its inoperative position towards its operative position, moving the front side of the closure panel to a higher level with respect to the vehicle roof after the wind deflector has substantially reached its operative position, and moving the closure panel further rearwardly with the wind deflector in its operative position.

BRIEF DESCRIPTION OF THE DRAWINGS

Further details and advantages of aspects of the invention appear from the following description with reference to the drawings showing an embodiment of the invention by way of example.

FIGS. 1-4 are central longitudinal sectional views of a vehicle roof comprising an embodiment of the roof assembly, illustrating a front closure panel and wind deflector of the roof assembly in four different positions.

The drawings and in first instance FIG. 1-4 show the fixed roof 1 of a vehicle, in this case a passenger car, which is provided with a roof opening 2 to accommodate a roof assembly. The fixed roof 1 in this case forms part of the vehicle, but can also be part of the roof assembly which is built in the vehicle as a complete roof. The roof assembly comprises a stationary part such as a frame 7 defining a roof opening passage 2' below the roof opening 2.

Figure 5:
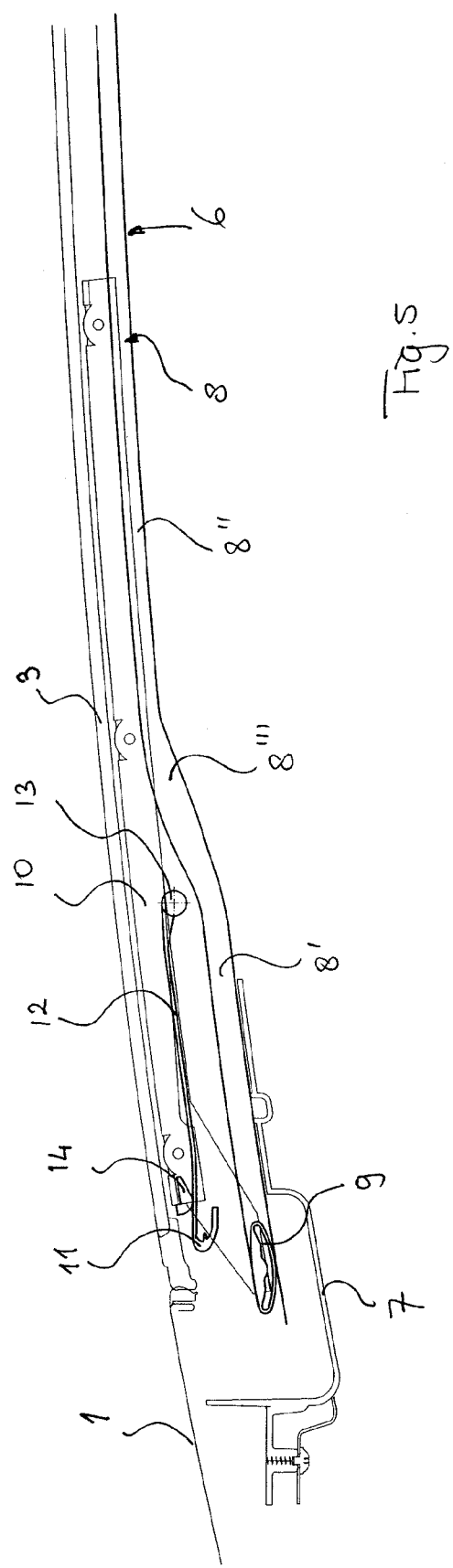
FIGS. 5-8 are enlarged longitudinal sectional views of a part of the vehicle roof of FIG. 1 and taken at the position of a guide rail, illustrating the closure panel and the cooperating wind deflector in four different positions.
Figure 6:
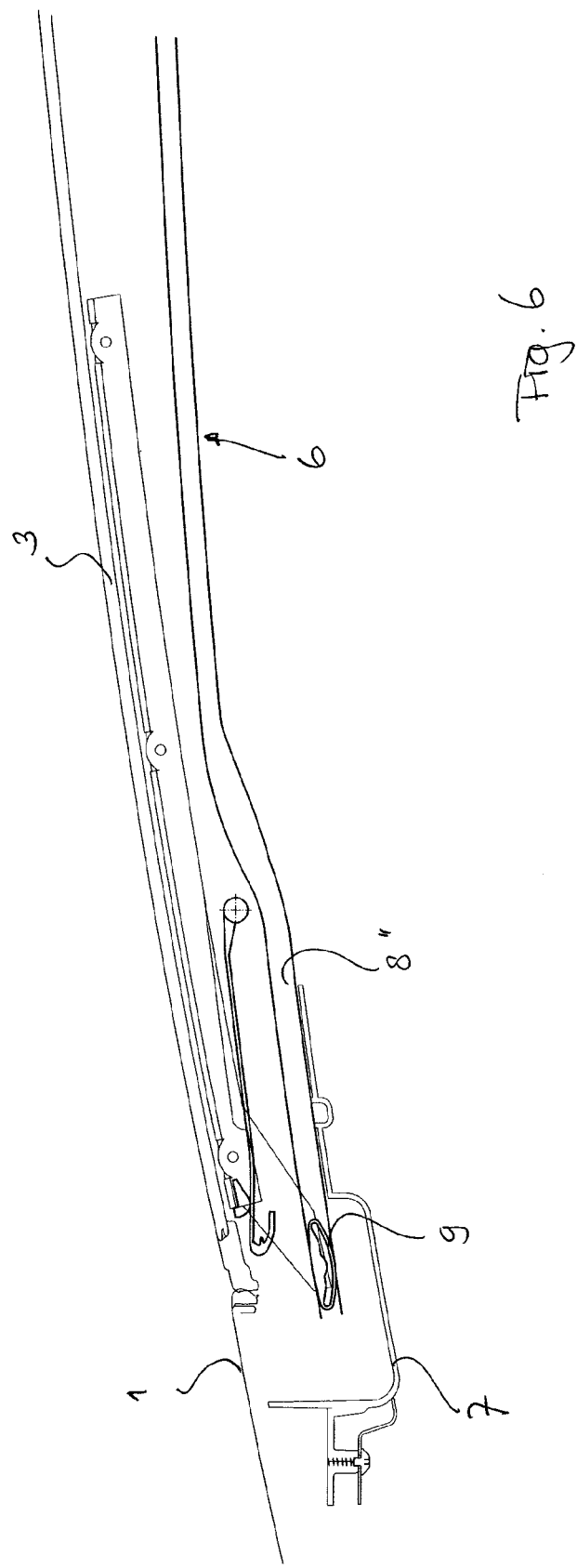
Figure 7:
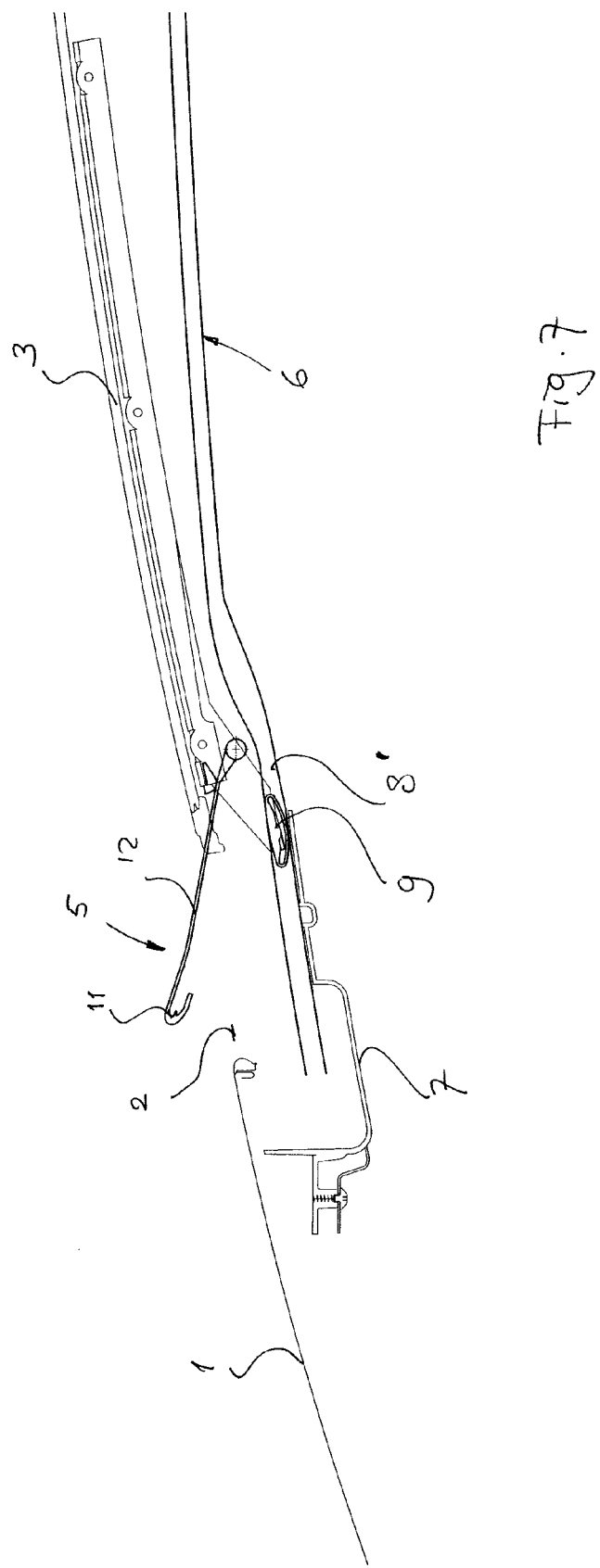
Figure 8:
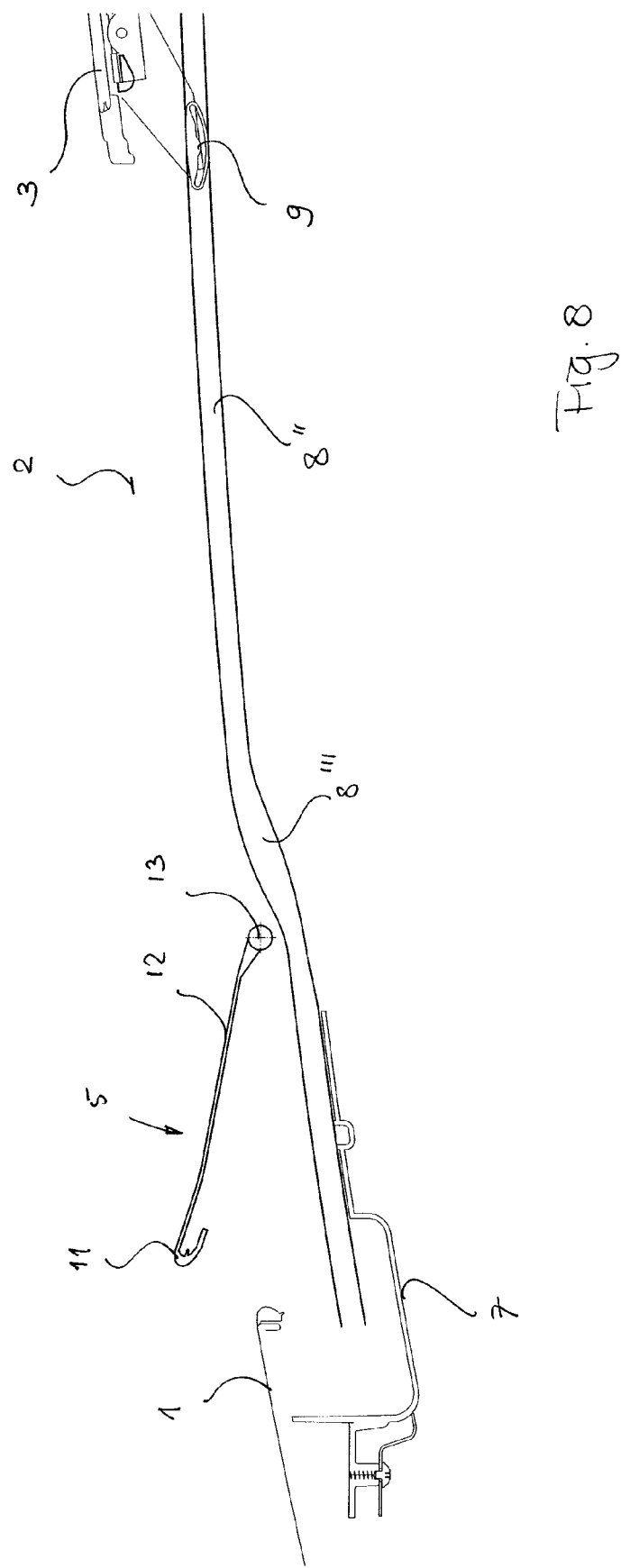

The roof assembly comprises at least one movable closure, here in the form of a rigid, one embodiment mainly transparent glass or plastic closure panel 3. The closure could also be constructed differently, for example including slats or a folding cover. In the embodiment of FIGS. 1-4, the roof assembly includes a second, rear closure panel 4 which may be either stationary or movable.

The front closure panel 3 of the roof assembly as shown is of the so-called top slider type, which means that the closure panel 3 is movable from a closed position in the roof opening 2 (FIG. 1), in which it is preferably flush with the fixed roof 1, to rearwardly displaced positions above a roof portion (here the closure panel 4) behind the roof opening 2 (FIGS. 3 and 4). In the embodiment shown, the closure panel 3 can first be moved into a venting position in which the rear edge of the panel 3 is mainly tilted and the panel 3 is kept substantially stationary in longitudinal and height direction of the vehicle (FIG. 2). After this tilting movement to the venting position according to FIG. 2, the panel is displaced rearwardly to the position according to FIG. 3. During this rearward displacement of the closure panel 3, a wind deflector 5, which is positioned at the front edge of the roof opening 2, is allowed to move from an inoperative position substantially below the level of the fixed roof 1 (in a recess in the frame) to an operative position in which it extends at least partly above the level of the fixed roof 1.

During the displacement of the closure panel 3 between the positions of FIGS. 2 and 3, the front edge of the panel 3 is kept low, that is substantially at its level in the closed position or even lower (with respect to the contour of the roof), until the wind deflector is substantially in its operative position. Upon further rearward movement of the closure panel 3 to the position according to FIG. 4, the front edge of the panel is also moved upwardly to such height that the panel 3 is able to move over the rear closure panel 4 to a large extent so as to open the roof opening 2 for the greater part. This method of operating the closure panel 3 is advantageous in order to prevent wind from entering the roof opening when the wind deflector is not fully deployed so that the aerodynamic behavior is improved.

FIGS. 5-8 illustrate the movements of the closure panel 3 and the wind deflector 5 in relation to a guide rail 6 which is provided on each lateral side of the roof opening 2. The guide rails 6 are part of or are provided on the stationary part of the roof assembly, in this case the frame 7 which is fastened to the fixed roof 1, in this case from below.

As is clear from these FIGS. 5-8, the guide rail 6 has a guide groove 8 including a front portion 8' a rear portion 8" and a connecting intermediate portion 8'". The front portion 8' is at a lower level with respect to the fixed roof 1 than the rear portion 8" and the connecting intermediate portion 8'" is inclined to connect both portions.

The guide groove 8 is intended to guide a slide shoe 9 which is fixed to the front end of a panel support 10 which is attached to the lower side of the closure panel 3 above the guide rail 6, so that the closure panel 3 is supported on both lateral sides by a panel support 10.

Due to the curvature of the guide groove 8 of the guide rail, the front edge of the closure panel 3 makes the movements as described with reference to FIGS. 1-4, and as clearly shown in FIGS. 5-8. Of course, it would also be conceivable to have a straight guide rail and to support the front edge of the panel 3 by means of an adjustable element of the closure moving mechanism, as is for example described in EP 2 078 630. A combination of both is conceivable as well.

Figure 9:
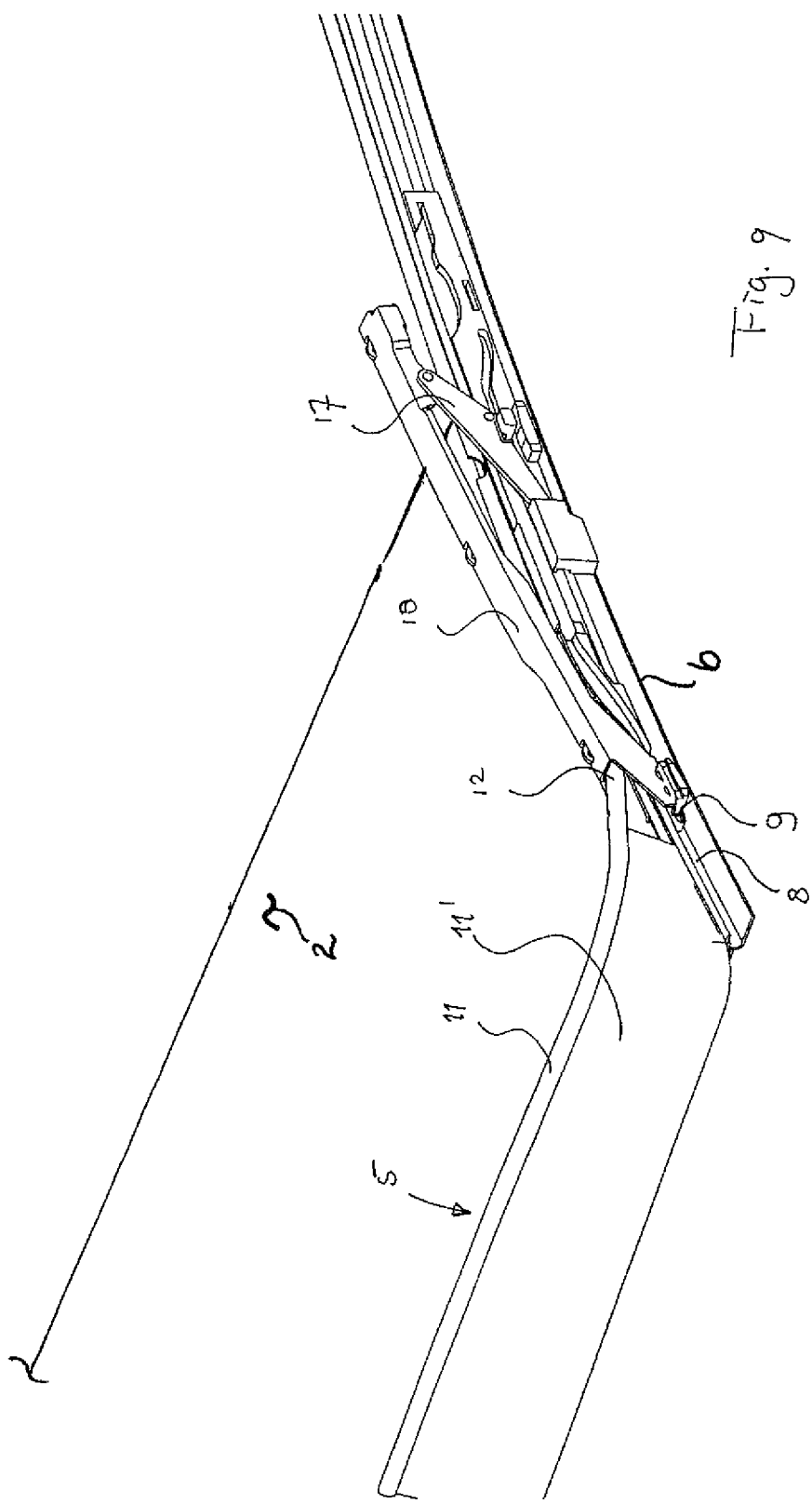
FIG. 9 is a perspective view of a part of the wind deflector and the closure moving mechanism in a position corresponding to that of FIG. 7.
Figure 10:
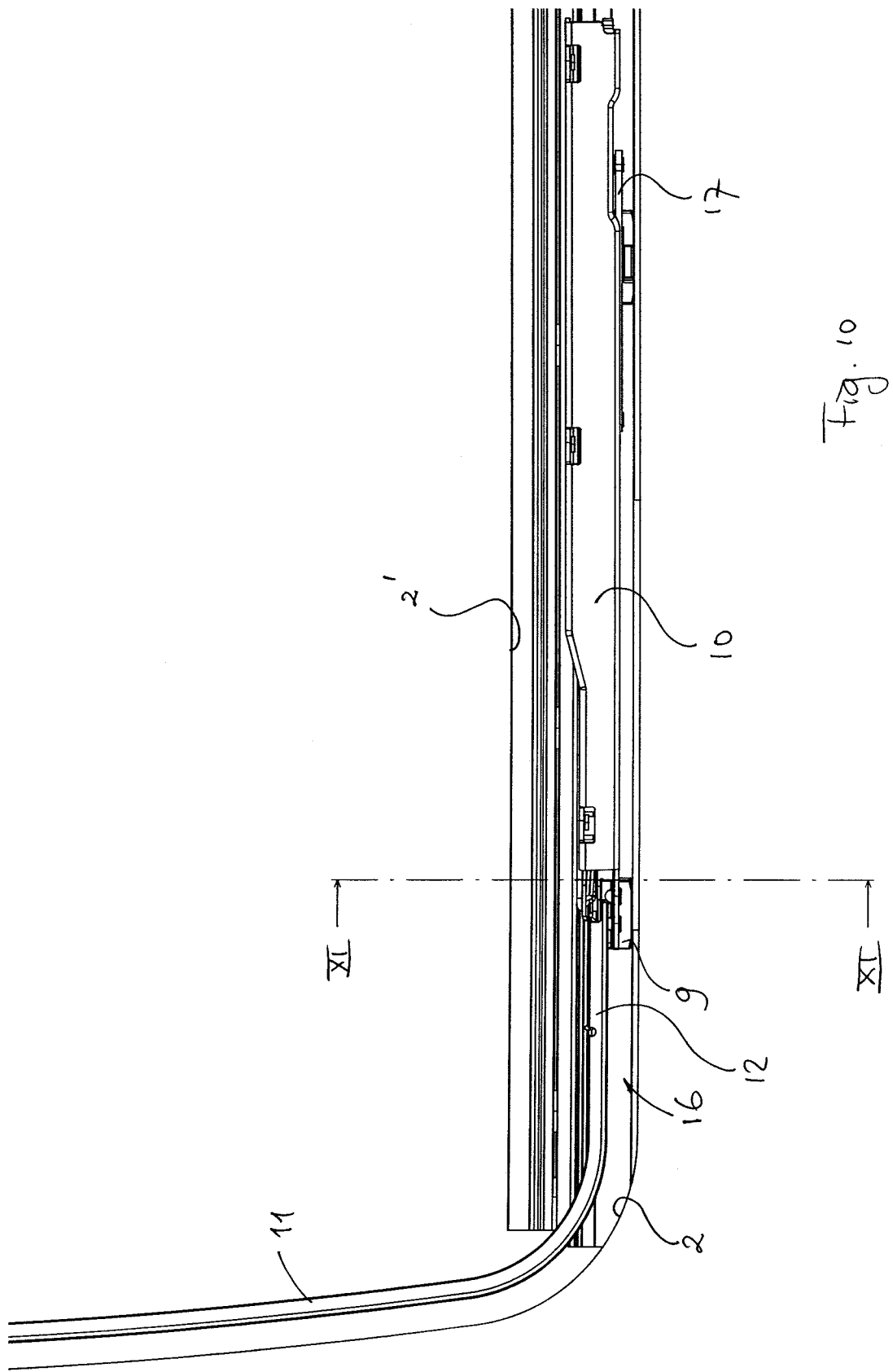
FIG. 10 is a plan view of the parts of FIG. 9.
Figure 11:
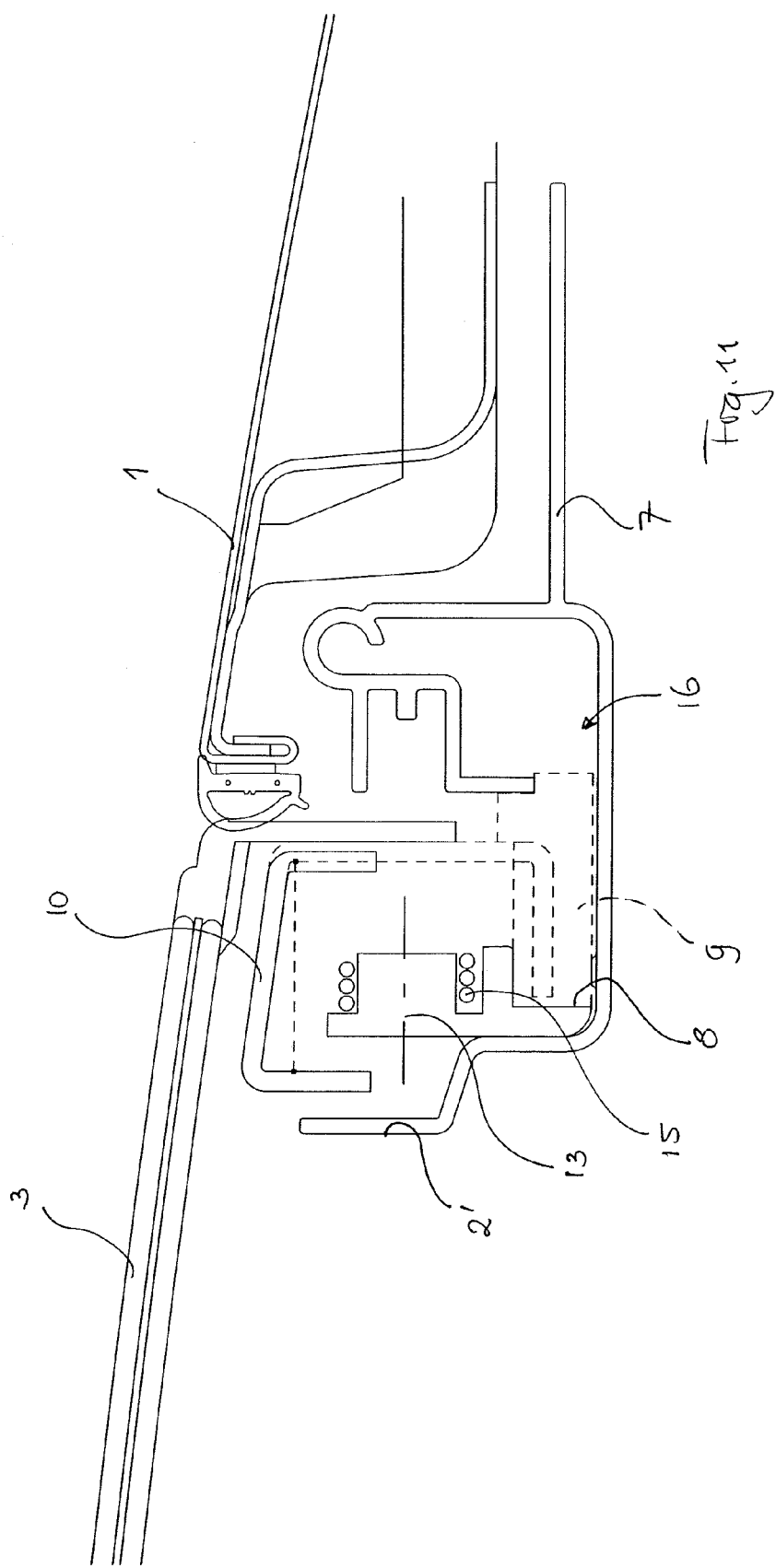
FIG. 11 is a simplified sectional view along the line XI-XI in FIG. 10, on a larger scale.

As is clear from FIGS. 5-8 in combination with FIGS. 9-11, the wind deflector 5 is provided with a rigid wind deflector body 11 extending along the front edge of the roof opening 2 and forming (in this case together with the netting 11') the functional part of the wind deflector. If desired the wind deflector arms 12 can be integrally formed at the lateral ends of the wind deflector body 11 and extend rearwardly in longitudinal direction of the vehicle up to a rear end of the arms 12. Each arm has an imaginary or structural pivoting axis 13 around which the arm 12 can pivot to move the wind deflector 5 between the operative and inoperative positions. In FIG. 11 it is shown that the pivot axis 13 is formed by an axle, but also other, pivot or non-pivot, support structures are conceivable for connecting the wind deflector arms 12 to the respective guide rails 6.

The control of the movements of the wind deflector 5 is effected by the panel support 10 which is provided with a sliding element 14 to slidably engage the upper side of the respective wind deflector arm 12 in order to move it (or allow it to move under pressure from a spring 15, see FIG. 10) when the closure panel 3 slides close to its closed position.

From the foregoing it follows that the wind deflector arm 12 is positioned within the boundaries of the guide rail 6 (when viewed in plan view) and the pivoting axis 13 is attacked to the guide rail 6 in the so called wet portion 16 of the guide rail (see FIG. 10, 11), that is the portion of the guide rail serving to catch and drain any water from the fixed roof 1 or closure panel 3. As the pivoting axis 13 and consequently the rear end of the wind deflector arm 12 is positioned rearwardly of the front end of the closure moving mechanism (in this case behind the slide shoe 9 and behind the front end of the panel support 10 when the panel 3 is in its closed position) the wind deflector arm 12 longitudinally overlaps with the closure moving mechanism.

As is shown in FIG. 11, the wind deflector arm 12 and the pivoting axis 13 also laterally overlap with parts of the closure moving mechanism, in this case with the panel support 10 and the slide shoe 9. This is enabled by allowing the panel support 10 to move over the wind deflector arm 12 and allowing the slide shoe 9 to move at least partly vertically under the wind deflector arm and its support structure. This latter is enabled by the lowered front portion 8' of the guide groove 8 guiding the guide shoe 9 and extending at least partly below the axle forming the pivoting axis. The low position of the front portion 8' therefore has two functions in this embodiment. The movement of the panel support 10 above the wind deflector arm 12 enables the support to control the movement of the wind deflector 5.

FIGS. 9-11 show several other parts of the closure moving mechanism, including a rear support 17, here in the form of a pivotable lever which is able to support the closure panel 3 in all positions and is allowed to move between the rear closure panel 4 and the fixed roof 1 in a manner known per se. For this purpose, the guide rail 6 does not only extend below the lateral sides of the roof opening, but also below the lateral sides of the rear closure panel 4. Of course it would also be possible to use a rear guide rail attached on the fixed roof 1 as is known in the prior art.

A pressure rigid drive cable (not shown) is connected to the closure moving mechanism and is engaged by a drive member such as an electric motor to drive the closure or closures of the roof assembly.

From the foregoing it is clear that aspects of the invention provide a roof assembly that includes a wind deflector having very favorable properties with respect to its integration in the roof assembly, in particular with respect to the placement of the wind deflector arms 12 in the guide rails 6. This saves space in the frame 7 thereby enabling a larger lateral dimension of the roof opening passage, and also leads to a more favorable aerodynamic placement of the wind deflector 5 in the roof opening 2. The opening and closing movements of the closure leads to an improved aerodynamic behavior of the roof assembly.

The invention is not limited to the embodiments described before, which may be varied widely within the scope of the invention as defined by the appended claims. The wind deflector may be constructed differently, for example with a separate wind deflector body and arms. The arms may be movable by a forced control mechanism and may move differently than through a pure pivoting movement. The wind deflector may be moved under control of the closure or for example under control of the drive cable through said forced control mechanism.

The invention claimed is:

1. A roof assembly for a vehicle having a roof opening in its fixed roof, comprising:
    a stationary part at least partially defining a roof opening passage below the roof opening;
    a movable closure panel for opening and closing the roof opening;
    guide rails in or on the stationary part extending laterally of the roof opening;
    a closure moving mechanism guided in said guide rails and having a front end, wherein the closure moving mechanism comprises panel supports fixed to the closure panel above respective guide rails, each of said panel supports being provided with a front slide shoe guided in the respective guide rail;
    a wind deflector positioned at a front edge of said roof opening, said wind deflector being movable between an inoperative lower position in which it is positioned substantially below the level of the vehicle roof and at least one operative upper position in which it at least partially extends above said level;
    arms supporting the wind deflector, each arm extending substantially rearwards up to a rear end of the arm, such that at least in one position of the closure panel the front end of the closure moving mechanism is positioned forwardly of the rear end of the arms, said arms are configured to move the wind deflector between the inoperative and operative positions, wherein the wind deflector arms are positioned in plan view at least partly within the lateral boundaries of the respective guide rails, and wherein each front slide shoe is guided in a guide groove of the respective guide rail which extends at least partly under a support structure of a respective wind deflector arm.

2. The roof assembly of claim 1, wherein each of the arms is configured to pivot around a pivoting axis, the pivoting axis of each arm being positioned in a part of the respective guide rail that serves to catch and drain any water from the roof or closure panel.

3. The roof assembly of claim 1, wherein the closure moving mechanism for the closure panel is configured to move the closure panel rearwardly above the vehicle roof, and wherein a front portion of the groove for the front slide shoe extends at a lower level than a rear portion thereof.

4. The roof assembly of claim 1, wherein, at least in the closed position of the closure panel, each panel support extends at least partly above the respective arm.

5. The roof assembly of claim 4, wherein each panel support has a sliding element configured to engage an upper side of the respective arm in order to move it when the closure panel slides close to its closed position.

6. The roof assembly of claim 1 wherein the arms and the wind deflector body are formed as an integral part.

7. The roof assembly of claim 1 constructed as a top slider in which the guide rails extend rearwardly beyond the roof opening that is closed by the closure panel, and wherein the closure panel is supported near its rear end on rear supports of the closure moving mechanism which are supported by the guide rails at least partly in positions behind said roof opening.

8. A roof assembly for a vehicle having a roof opening in its fixed roof, comprising:
    a movable closure comprising a closure panel;
    a pair of spaced apart guide rails;
    a pair of closure moving mechanisms, each closure moving mechanism guided in one of said guide rails and having a front end;
    a wind deflector;
    arms supporting the wind deflector, each arm being connected to one of the guide rails through a support structure and each arm extending substantially rearwards up to a rear end of the arm, such that at least in one position of the closure panel the front ends of the closure moving mechanisms are positioned forwardly of the rear end of the arms, said arms being configured to move the wind deflector between a first position and a second position, the second position being further away from the guide rails than the first position; and wherein the wind deflector arms, including their support structures, are positioned in plan view at least partly within the lateral boundaries of a respective guide groove of the guide rails each guide groove extends at least partly vertically under a part of the support structure of the respective arm.

9. The roof assembly of claim 8, wherein the arms are configured to pivot around a pivoting axis, the pivoting axis of each arm being positioned in a part of the respective guide rail configured to catch and drain water.

10. The roof assembly of claim 8 wherein the closure moving mechanism comprises panel supports fixed to the closure panel above the respective guide rail, each of said panel supports being provided with a front slide shoe guided in the respective guide rail.

11. The roof assembly of claim 10, wherein each front slide shoe is guided in a guide groove of the respective guide rail which extends at least partly under the support structure of the arm.

12. The roof assembly of claim 10, wherein the closure moving mechanism for the closure panel is configured to move the closure panel upwardly and rearwardly, and wherein a front portion of the groove for the front slide shoe extends at a lower level than a rear portion thereof.

13. The roof assembly of claim 10, wherein, at least in the first position of the closure panel, each panel support extends at least partly above a respective arm.

14. The roof assembly of claim 13, wherein each panel support has a sliding element configured to engage an upper side of the respective arm in order to move it when the closure panel moves to the first position.

15. The roof assembly of claim 8 wherein the wind deflector arms and a wind deflector body of the wind deflector are formed as an integral part.

* * * * *